United States Patent [19]
Machida et al.

[11] Patent Number: 5,980,421
[45] Date of Patent: Nov. 9, 1999

[54] TOROIDAL TYPE CONTINUOUSLY VARIABLE TRANSMISSION

[75] Inventors: Hisashi Machida; Shinji Miyata, both of Fujisawa; Takashi Imanishi, Yokohama, all of Japan

[73] Assignee: NSK Ltd., Tokyo, Japan

[21] Appl. No.: 09/062,588

[22] Filed: Apr. 20, 1998

[30] Foreign Application Priority Data

Apr. 22, 1997 [JP] Japan .................................. 9-104734
Apr. 23, 1997 [JP] Japan .................................. 9-106171

[51] Int. Cl.⁶ ........................... F16H 37/02; F16H 15/36; F16H 15/38
[52] U.S. Cl. .................................... 476/10; 476/2; 476/8; 476/9
[58] Field of Search .................. 476/40, 10, 42, 476/2, 9, 8

[56] References Cited

U.S. PATENT DOCUMENTS

| | | | |
|---|---|---|---|
| 4,524,641 | 6/1985 | Greenwood | 476/40 |
| 4,911,030 | 3/1990 | Kraus | 476/10 |
| 5,099,710 | 3/1992 | Nakano | 476/10 |
| 5,681,236 | 10/1997 | Inoue | 476/10 |

FOREIGN PATENT DOCUMENTS

| | | |
|---|---|---|
| 62-71465 | 5/1987 | Japan . |
| 1-169169 | 7/1989 | Japan . |
| 1-173552 | 12/1989 | Japan . |
| 1-312266 | 12/1989 | Japan . |
| 2-163567 | 6/1990 | Japan . |
| 3-74667 | 3/1991 | Japan . |
| 4-69439 | 3/1992 | Japan . |

*Primary Examiner*—Thomas R. Hannon
*Assistant Examiner*—David Fenstermacher
*Attorney, Agent, or Firm*—Vorys, Sater, Seymour and Pease LLP

[57] ABSTRACT

The amounts of displacement of trunnions installed in first and second cavities are made equal to each other irrespective of the amount of resilient deformation. Also, if the worst should happen, the stability of the running of an automobile is secured. The supply and discharge of pressure oil to first and second actuators for displacing the trunnions installed in the first and second cavities are effected by first and second control valves independent of each other. A value is included for controlling so that the difference between oil pressure fed into the first actuator and oil pressure fed into the second actuator may not become great.

7 Claims, 11 Drawing Sheets

TOROIDAL TYPE CONTINUOUSLY VARIABLE TRANSMISSION

BACKGROUND OF THE INVENTION

1. Field of the Invention

A toroidal type continuously variable transmission according to the present invention is utilized as an automatic transmission for an automobile of which the output is relatively great.

2. Related Background Art

It has been studied to use a toroidal type continuously variable transmission as schematically shown in FIGS. 5 and 6 of the accompanying drawings as a transmission for an automobile. This toroidal type continuously variable transmission is such that as disclosed, for example, in Japanese Laid-Open Utility Model Application No. 62-71465, an input side disc 2 is supported concentrically with an input shaft 1 and an output side disc 4 is fixed to the end portion of an output shaft 3 disposed concentrically with the input shaft 1. Inside a casing containing the toroidal type continuously variable transmission therein, there are provided trunnions 6, 6 pivotable about pivots 5, 5 located at positions twisted relative to the input shaft 1 and the output shaft 3.

These trunnions 6, 6 are provided with the pivots 5, 5 on the outer sides of the opposite end portions thereof. Also, the base end portions of displaceable shafts 7, 7 are supported on the central portions of the trunnions 6, 6 and the trunnions 6, 6 are pivotally moved about the pivots 5, 5, whereby the angles of inclination of the displaceable shafts 7, 7 are made adjustable. Power rollers 8, 8 are rotatably supported around the displaceable shafts 7, 7 supported on the trunnions 6, 6. These power rollers 8, 8 are sandwiched between the input side disc 2 and the output side disc 4. The inner sides 2$a$ and 4$a$ of the input side and output side discs 2 and 4, respectively, which are opposed to each other have their cross-sections forming a concave surface provided by an arc about the pivot 5 being rotated. The peripheral surfaces 8$a$, 8$a$ of the power rollers which are formed into spherical convex surfaces are made to bear the aforementioned inner sides 2$a$ and 4$a$.

A pressing device 9 of the loading cam type is provided between the input shaft 1 and the input side disc 2, and the input side disc 2 is resiliently pressed toward the output side disc 4 by the pressing device 9. This pressing device 9 is comprised of a cam plate 10 rotatable with the input shaft 1, and a plurality of (e.g. four) rollers 12, 12 retained by a retainer 11. A cam surface 13 which is an uneven surface extending in the circumferential direction is formed on one side (the right side as viewed in FIGS. 5 and 6) of the cam plate 10, and a similar cam surface 14 is formed on the outer side (the left side as viewed in FIGS. 5 and 6) of the input side disc 2. The plurality of rollers 12, 12 are supported for rotation about shafts radial relative to the center of the input shaft 1.

When during the use of the toroidal type continuously variable transmission constructed as described above, the cam plate 10 rotates with the rotation of the input shaft 1, the plurality of rollers 12, 12 are pressed against the cam surface 14 which is the outer side of the input side disc 2 by the cam surface 13. As the result, the input side disc 2 is pressed by the plurality of power rollers 8, 8 and at the same time, the input side disc 2 is rotated on the basis of the pressing of the pair of cam surfaces 13, 14 and the plurality of rollers 12, 12 against each other. This rotation of the input side disc 2 is transmitted to the output side disc 4 through the plurality of power rollers 8, 8, whereby the output shaft 3 fixed to this output side disc 4 is rotated.

When the rotational speed ratio (transmission gear ratio) between the input shaft 1 and the output shaft 3 is to be changed, when deceleration is first to be effected between the input shaft 1 and the output shaft 3, the trunnions 6, 6 are pivotally moved about the pivots 5, 5 and the displaceable shafts 7, 7 are inclined so that the peripheral surfaces 8$a$, 8$a$ of the power rollers 8, 8 may bear against the nearly central portion of the inner side 2$a$ of the input side disc 2 and the nearly outer peripheral portion of the inner side 4$a$ of the output side disc 4, respectively, as shown in FIG. 5. When conversely, acceleration is to be effected, the trunnions 6, 6 are pivotally moved about the pivots 5, 5 and the displaceable shafts 7, 7 are inclined so that the peripheral surfaces 8$a$, 8$a$ of the power rollers 8, 8 may bear against the nearly outer peripheral portion of the inner side 2$a$ of the input side disc 2 and the nearly central portion of the inner side 4$a$ of the output side disc 4, respectively, as shown in FIG. 6. If the angle of inclination of each of the displaceable shafts 7, 7 is made medium between FIGS. 5 and 6, a medium transmission gear ratio will be obtained between the input shaft 1 and the output shaft 3.

FIGS. 7 and 8 of the accompanying drawings show a toroidal type continuously variable transmission described in Japanese Utility Model Application No. 63-69293 (Japanese Laid-Open Utility Model Application No. 1-17352) which has been made more specific. An input side disc 2 and an output side disc 4 are rotatably supported around a tubular input shaft 15 through needle bearings 16, 16, respectively. A cam plate 10 is spline-engaged with the outer peripheral surface of the end portion (the left end portion as viewed in FIG. 7) of the input shaft 15, and is prevented from moving away from the input side disc 2 by a flange portion 17. This cam plate 10 and rollers 12, 12 together constitute a pressing device 9 of the loading cam type for rotating the input side disc 2 while pressing it toward the output side disc 4. An output gear 18 is coupled to the output side disc 4 by keys 19, 19 so that the output side disc 4 and the output gear 18 may be rotated in synchronism with each other.

The opposite end portions of the pair of trunnions 6, 6 are supported on a pair of plates 20, 20 for pivotal movement and displacement in the axial direction (the front to back direction as viewed in FIG. 7, or the left to right direction as viewed in FIG. 8). Displaceable shafts 7, 7 are supported in circular holes 23, 23 formed in the intermediate portions of the trunnions 6, 6. The displaceable shafts 7, 7 have support shaft portions 21, 21 parallel to each other and eccentric with respect to each other and pivot portions 22, 22. The support shaft portions 21, 21 are rotatably supported inside the circular holes 23, 23 through needle bearings 24, 24. Also, power rollers 8, 8 are rotatably supported around the pivot portions 22, 22 through radial needle bearings 25, 25.

The pair of displaceable shafts 7, 7 are provided at opposite positions of 180° with respect to the input shaft 15. Also, the direction in which the pivot portions 22, 22 of the displaceable shafts 7, 7 are eccentric relative to the support shaft portions 21, 21 is the same direction (a direction opposite to the left to right direction as viewed in FIG. 8) with respect to the direction of rotation of the input side and output side discs 2 and 4. Also, the direction of eccentricity is a direction substantially orthogonal to the direction of disposition of the input shaft 15. Accordingly, the power rollers 8, 8 are supported for some displacement in the direction of disposition of the input shaft 15. As the result, even when due to the dimensional accuracy of each constituent, the resilient deformation of each constituent during the transmission of power, etc., the power rollers 8,

8 tend to be displaced in the axial direction of the input shaft 15 (the left to right direction as viewed in FIG. 7 or the front to back direction as viewed in FIG. 8), this placement can be absorbed without any unreasonable force being applied to each constituent.

Also, between the outer sides of the power rollers 8, 8 and the inner sides of the intermediate portion of the trunnions 6, 6, thrust ball bearings 26, 26 for supporting the power rollers 8, 8, and thrust needle bearings 27, 27 for supporting thrust loads applied to outer races 28, 28 which will be described next are provided in succession from the outer sides of the power rollers 8, 8. The thrust ball bearings 26, 26 permit the rotation of the power rollers 8, 8 while supporting the loads in the thrust direction applied to the power rollers 8, 8. Also, the thrust needle bearings 27, 27 permit the outer races 28, 28 and the pivot portions 22, 22 to pivotally move about the support shaft portions 21, 21 while supporting thrust loads applied to the outer races 28, 28 constituting the thrust ball bearings 26, 26.

Further, driving rods 29, 29 are coupled to one end portion (the left end portion as viewed in FIG. 8) of the trunnions 6, 6 and driving pistons 30, 30 are secured to the outer peripheral surfaces of the intermediate portions of the driving rods 29, 29. These driving pistons 30, 30 are oil-tightly fitted in driving cylinders 31, 31, respectively. These driving pistons 30, 30 and driving cylinders 31, 31 together constitute an actuator for displacing the trunnions 6, 6 axially of the pivots 5, 5.

During the operation of the toroidal type continuously variable transmission constructed as described above, the rotation of the input shaft 15 is transmitted to the input side disc 2 through the pressing device 9. The rotation of this input side disc 2 is transmitted to the output side disc 4 through the pair of power rollers 8, 8 and further the rotation of this output side disc 4 is taken out from the output gear 18.

When the rotational speed ratio between the input shaft 15 and the output gear 18 is to be changed, the pair of driving pistons 30, 30 are displaced by the same distance in opposite directions. With the displacement of these driving pistons 30, 30, the pair of trunnions 6, 6 are displaced in opposite directions and for example, the lower power roller 8 as viewed in FIG. 8 is displaced to the right side and the upper power roller 8 as viewed in FIG. 8 is displaced to the left side. As the result, the direction of a force in the tangential direction acting on the portions of contact between the peripheral surfaces 8a, 8a of the power rollers 8, 8 and the inner sides 2a and 4a of the input side disc.2 and the output side disc 4, respectively, changes. With this change in the direction of this force, the trunnions 6, 6 pivotally move in opposite directions about the pivots 5, 5 pivotally supported on the support plates 20, 20. As the result, as shown in FIGS. 5 and 6, the positions of contact between the peripheral surfaces 8a, 8a of the power rollers 8, 8 and the aforementioned inner sides 2a, 4a change, and the rotational speed ratio between the input shaft 15 and the output gear 18 changes.

Also, arcuate surfaces 32, 32 concentric with the pivots 5, 5 are formed on the outer peripheral surfaces of the end portions of the trunnions 6, 6. A cable 33 as shown in FIG. 9 of the accompanying drawings is extended in an X-shape between these two arcuate surfaces 32, 32. Fastenings 34, 34 are provided on those portions of this cable 33 which correspond to the arcuate surfaces 32, 32, and these fastenings are engaged with concave stepped portions formed in the intermediate portions of the arcuate surfaces 32, 32 to thereby prevent the cable 33 and the arcuate surfaces 32, 32 from slipping. Such a cable 33 has the role of synchronizing the tilting movements (pivotal movements about the pivots 5, 5) of the two trunnions with each other. Even during the trouble of an actuator (hydraulic driving apparatus) comprised of the driving rods 29, 29, the driving pistons 30, 30, the driving cylinders 31, 31, etc., the cable 33 tilts the trunnions 6, 6 in synchronism with each-other. Accordingly, it never happens that even during the trouble of the actuator, the direction of inclination of the plurality of power rollers 8, 8 sandwiched between the input side disc 2 and the output side disc 4 forming a pair becomes irregular. As the result, it never happens that an excessively great frictional force acts between the inner sides 2a, 4a of the discs 2, 4 and the peripheral surfaces 8a, 8a of the power rollers 8, 8 and thus, it never happens that the toroidal type continuously variable transmission is subjected to fatal damage, and moreover minimum power transmission can be secured.

In both of the toroidal type continuously variable transmissions shown in FIGS. 5 and 6 and FIGS. 7 and 8, two power rollers 8, 8 are provided in the cavity between the inner side 2a of the input side disc 2 and the inner side 4a of the output side disc 4 which are opposed to each other. The two power rollers 8, 8 are disposed on diametrally opposite sides with respect to the centers of rotation of the two discs 2 and 4. In contrast, a toroidal type continuously variable transmission in which three power rollers are provided in the cavity between the inner side of an input side disc and the inner side of an output side disc which are opposed to each other, whereby great power can be transmitted between the two discs is also known as described, for example, in Japanese Laid-Open Patent Application No. 3-74667.

FIG. 10 of the accompanying drawings shows such prior-art structure. The intermediate portions of supporting pieces 36, 36 each bent to 120° are pivotally supported at three circumferentially equidistant positions on a fixed frame 35. Trunnions 6, 6 are supported between the adjacent supporting pieces 36, 36 for pivotal movement and displacement in the axial direction thereof. One end of each of driving rods 29, 29 is connected to one end portion of each of these trunnions 6, 6, and the other ends of the driving rods 29, 29 are connected to the driving pistons 30, 30 of driving cylinders 31, 31 which are an actuator. The driving cylinders 31, 31 lead to the discharge port of a pump 38 which is an oil pressure source through a control valve 37. This control valve 37 is provided with a sleeve 39 and a spool which are displaceable in the axial direction (the left to right direction as viewed in FIG. 10).

When the angles of inclination of the power rollers 8, 8 pivotally supported on the trunnions 6, 6 by displaceable shafts 7, 7 are to be changed, the sleeve 39 is axially displaced by a control motor 41. As the result, pressure oil discharged from the pump 38 is fed into the driving cylinders 31, 31 through hydraulic piping. By this pressure oil, the driving pistons 30, 30 fitted in the driving cylinders 31, 31 are displaced in the same direction with respect to the direction of rotation of the input side disc 2 and the output side disc 4 (see FIGS. 5 to 7). The operating oil forced out of the driving cylinders 31, 31 with the displacement of the driving pistons 30, 30 is returned to an oil reservoir 42 through hydraulic piping (partly not shown) also including the control valve 37.

On the other hand, the displacement of the driving piston 30 resulting from the feeding-in of the pressure oil is transmitted to the spool 40 through a cam 43 and a link 44 to thereby displace this spool 40 in the axial direction. As the result, in a state in which the driving piston 30 has been displaced by a predetermined amount, the flow path of the control valve 37 is closed and the supply and discharge of the pressure oil to the driving cylinders 31, 31 are stopped. Accordingly, the amounts of displacement of the trunnions in the axial direction and further, the angles of inclination of the power rollers 8, 8 become ones only corresponding to the amount of displacement of the sleeve 39 by the control motor 41. The basic structure for changing the angles of inclination of the power rollers 8, 8 by a predetermined amount may be the structure as shown in FIG. 10 wherein three power rollers are provided in the cavity or the structure as shown in FIGS. 5 to 8 wherein two power rollers are provided in the cavity.

Also, when a toroidal type continuously variable transmission is utilized as a transmission for an automobile having an engine of a greater output, it is known as described, for example, in Japanese Laid-Open Patent Application No. 4-69439, etc. to provide each two input side discs 2 and output side discs 4 to secure transmittable power, and arrange these each two input side discs 2 and output side discs 4 in parallel to the direction of transmission of the power. FIG. 11 of the accompanying drawings shows the structure described in this publication.

In this prior-art structure, an input shaft 15 is supported inside a housing 45 for rotation only. This input shaft 15 comprises a first half portion 15a coupled to a driving shaft for feeding power into the toroidal type continuously variable transmission, and a second half portion 15b somewhat rotatable relative to the first half portion 15a. Near the opposite end portions of the second half portion 15b corresponding to a rotary shaft in the axial direction (the left to right direction as viewed in FIG. 11) thereof, a pair of input side discs 2, 2 corresponding to first and second discs are supported through ball splines 46, 46 with their respective inner sides 2a, 2a corresponding to first concave surfaces opposed to each other.

A washer plate 47 and belleville springs 48, 48 are provided in series with each other between the back (a surface axially opposite to the inner side 2a) of one (right as viewed in FIG. 11) input side disc 2 and a loading nut 87 secured to the end portion of the first half portion 15a. Also, a thrust needle bearing 49 and belleville springs 48, 48 are provided in series with each other between the back of the other (left as viewed in FIG. 11) input side disc 2 and the portion near the inner periphery of one surface (the right side as viewed in FIG. 11) of a cam plate 10 constituting a pressing device 9. This thrust needle bearing 49 compensates for the relative rotation of the cam plate 10 and the other input side disc 2. Also, pre-loads toward the output side discs 4, 4 which will be described next are imparted to the input side discs 2, 2 by the belleville springs 48, 48.

Around the intermediate portion of the second half portion 15b, the pair of output side discs 4, 4 corresponding to third and fourth discs are supported for rotation relative to the image shaft 15 with their respective inner sides 4a, 4a corresponding to second concave surfaces opposed to the inner sides 2a, 2a of the input side discs 2, 2. Also, a plurality of power rollers 8, 8 rotatably supported on a plurality of trunnions 6, 6 through a displaceable shaft 7 (see FIGS. 5 to 8) are sandwiched between the inner sides 2a, 4a of the input side and output side discs 2 and 4. The power rollers 8, 8 are inclined in synchronism with each other to make the transmission gear ratios between the input side discs 2, 2 and the output side discs 4, 4 coincident with each other.

Also, on a portion inside the housing 45 and opposite to the first half portion 15a, an output shaft 50 is rotatably supported concentrically with and bearings 55, 55 are provided between the inner peripheral surface of portions of the output side discs 4, 4 which protrude from the sleeve 53 and the outer peripheral surface of the input shaft 15. These roller bearings 55, 55 permit the relative rotation and axial relative displacement of the output side discs 4, 4 and the input shaft 15.

On the other hand, inside the housing 45, a transmission shaft 56 is rotatably supported in parallelism to the input shaft 15 and the output shaft 50. A first transmission gear 57 fixed to one end (the left end as viewed in FIG. 11) of the transmission shaft 50 and the output gear 18a are brought into direct meshing engagement with each other, and a second transmission gear 58 fixed to the other end (the right end as viewed in FIG. 11) independently of the second half portion 15b of the input shaft 15. Rotation transmitting means is provided between the output shaft 50 and the pair of output side discs 4, 4, whereby the rotation of the output side discs 4, 4 is transmittable to the output shaft 50.

In the inside portion of a through-hole 52 formed in a partition wall 51 present in a portion inside the housing 45 and between the pair of output side discs 4, 4, a tubular sleeve 53 is supported by a pair of anti-friction bearings 54, 54 to constitute the rotation transmitting means. The pair of output side discs 4, 4 are spline-engaged with the opposite end portions of this sleeve 53. An output gear 18a is secured to the intermediate portion of the sleeve 53 and the inside portion of the partition wall 51. Further, roller of the transmission shaft 56 and a third transmission gear 59 fixed to the end portion of the output shaft 50 are brought into meshing engagement with each other through an idle gear, not shown. By such rotation transmitting means, the output shaft 50 is rotated in a direction opposite to the direction of rotation of the pair of output side discs 4, 4 with the rotation of these output side discs 4, 4. Between the first half portion 15a and the other (left as viewed in FIG. 11) input side disc 2, the pressing device 9 of the loading cam type is provided as in the toroidal type continuously variable transmissions shown in FIGS. 5 to 7. A thrust ball bearing 88 is provided between the cam plate 10 constituting this pressing device 9 and a flange portion 17 formed on the outer peripheral surface of the front end portion of the second half portion 15b, whereby during the operation of the pressing device 9, the relative displacement of the cam plate 10 and the second half portion 15b in the direction of rotation is made free while a thrust load acting on the cam plate 10 is supported.

During the operation of the toroidal type continuously variable transmission shown in FIG. 11 which is constructed as described above, the pair of input side discs 2, 2 rotate at a time with the rotation of the input shaft 15, and these rotations are transmitted to the pair of output side discs 4, 4 at a time and at the same transmission gear ratio, and are transmitted to the output shaft 50 by the above-described rotation transmitting means and are taken out. At this time, the transmission of the rotational force is effected in two systems parallel to each other and therefore, great power (torque) becomes transmittable. Also, during the operation, the spacing between the pair of input side discs 2, 2 tends to be narrowed by the work of the pressing device 9. As the result, the inner sides 2a, 2a of the input side discs 2, 2 and the inner sides 4a, 4a of the output side discs 4, 4 strongly bear against the peripheral surfaces 8a, 8a of the power rollers 8, 8, whereby the transmission of power is effected efficiently.

In the case of the toroidal type continuously variable transmission of the so-called double cavity type as shown in FIG. 11 wherein the transmission of the rotational force is effected in two systems parallel to each other, it is necessary to make the angles of inclination of the trunnions 6, 6 installed in respective cavities, i.e., a first cavity 60 between one input side disc 2 and the output side disc 4 opposed to this input side disc 2, and a second cavity 61 between the other input side disc 2 and the output side disc 4 opposed to this input side disc 2, coincident with each other. If the angle of inclination of the trunnion 6 installed in the first cavity 60 and the angle of inclination of the trunnion installed in the second cavity 61 differ from each other, slip occurs on the portions of contact between the peripheral surfaces 8a, 8a of the power rollers 8, 8 and the inner sides 2a, 4a of the input side and output side discs 2 and 4, in the first and second cavities 60 and 61. Such slip not only aggravates the transmission efficiency of the toroidal type continuously variable transmission, but also becomes the cause of a trouble such as abnormal abrasion or burning in a remarkable case.

In contrast, in the case of a toroidal type continuously variable transmission of the known double cavity type, oil pressure fed into driving cylinders 31, 31 (FIG. 8) for driving trunnions 6, 6 installed in both cavities 60 and 61 axially of pivots 5, 5 has been controlled by a single control valve 37 (FIG. 10). Accordingly, the oil pressure bed into one driving cylinder 31 and the oil pressure bed into the other driving cylinder 31 become equal to each other. Also, not only the trunnions 6, 6 installed in the same cavity have been connected together by the cable 33 as shown in FIG. 6 and the angles of inclination of these trunnions 6, 6 have been made mechanically coincident with each other, but the trunnions 6, 6 in the different cavities 60, 61 have also been connected together by a cable and the angles of inclination of the trunnions 6, 6 in the both cavities 60, 61 have been made mechanically coincident with each other.

If forces required to displace the trunnions 6, 6 installed in the first and second cavities 60 and 61 axially by a predetermined amount are equal to each other, no problem will arise in particular even if the oil pressure fed into one driving cylinder 31 and the oil pressure fed into the other driving cylinder 31, regarding the both cavities 60, 61, are made equal to each other. However, when a toroidal type continuously variable transmission of the double cavity type is actually constructed, the amounts of displacement of trunnions 6, 6 installed in the cavities 60, 61 in the axial direction of the pivots 5, 5 (FIGS. 5, 6 and 8) differs from each other in some cases due to the difference in construction between the portions of the cavities 60, 61, or due to the difference in the amount of resilient deformation based on an unavoidable dimensional error in working even if the same forces are applied to these trunnions 6, 6.

Therefore, in the case of the toroidal type continuously variable transmission of the double cavity type according to the prior art, there cannot be denied the possibility that the transmission efficiency of the toroidal type continuously variable transmission is aggravated or a trouble such as abnormal abrasion or burning occurs, on the basis of the slip in the portions of contact between the peripheral surfaces 8a, 8a of the power rollers 8, 8 and the inner sides 2a, 4a of the input side and output side discs 2 and 4.

SUMMARY OF THE INVENTION

The toroidal type continuously variable transmission of the present invention has as its object to prevent the creation of a difference between the amounts of displacement of trunnions 6, 6 in cavities 60, 61 which may cause such a reduction in efficiency or a trouble.

The toroidal type continuously variable transmission of the present invention, like the aforedescribed prior-art toroidal type continuously variable transmission of the double cavity type, is provided with a rotary shaft, first and second discs, third and fourth discs, a first trunnion, a second trunnion, a plurality of power rollers, a first actuator, a second actuator and power taking-out means.

The first disc and the second disc have their axial one surface made into a first concave surface of an arcuate cross-sectional shape, and are supported on the axially opposite end portions of the rotary shaft for rotation with the rotary shaft with the first concave surfaces opposed to each other.

Also, the third disc and the fourth disc have their axial one surface made into a second concave surface of an arcuate cross-sectional shape, and are supported around the intermediate portion of the rotary shaft for rotation and axial displacement relative to the rotary shaft with the second concave surfaces and the first concave surfaces opposed to each other.

Also, the first trunnion is disposed between the first disc and the third disc with respect to the axial direction, is displaceable axially of and pivotally movable about a pivot lying at a position twisted relative to the rotary shaft, and is pivotally moved about the pivot with the displacement in the axial direction of the pivot.

Also, the second trunnion is disposed between the second disc and the fourth disc with respect to the axis direction, is displaceable axially of and pivotally movable about a pivot lying at a position twisted relative to the rotary shaft, and is pivotally moved about the pivot with the displacement in the axial direction of the pivot.

Also, the plurality of power rollers have their peripheral surfaces made into rotation arcuate surface-like convex surfaces, are rotatably supported on a displaceable shaft supported by the first and second trunnions, and are sandwiched between first and second concave surfaces provided on the first and third discs or between first and second concave surfaces provided on the second and fourth discs.

Also, the first actuator displaces the first trunnion axially of the pivot on the basis of the supply or discharge of pressure oil, and the second actuator displaces the second trunnion axially of the pivot on the basis of the supply or discharge of pressure oil.

Further, the power taking-out means is for taking out the rotation of the third and fourth discs.

Particularly, in the toroidal type continuously variable transmission of the present invention, provision is made of a first supply and discharge flow path for supplying and discharging the pressure oil to the first actuator, and a second supply and discharge flow path provided independently of the first supply and discharge flow path to supply and discharge the pressure oil to the second actuator. A first control valve for controlling the supply and discharge of the pressure oil to the first actuator is provided in the course of the first supply and discharge flow path, and a second control valve for controlling the supply and discharge of the pressure oil to the second actuator is provided in the course of the second supply and discharge path. These first and second control valves control independently of each other.

DESCRIPTION OF THE PREFERRED EMBODIMENTS

Figure 1:
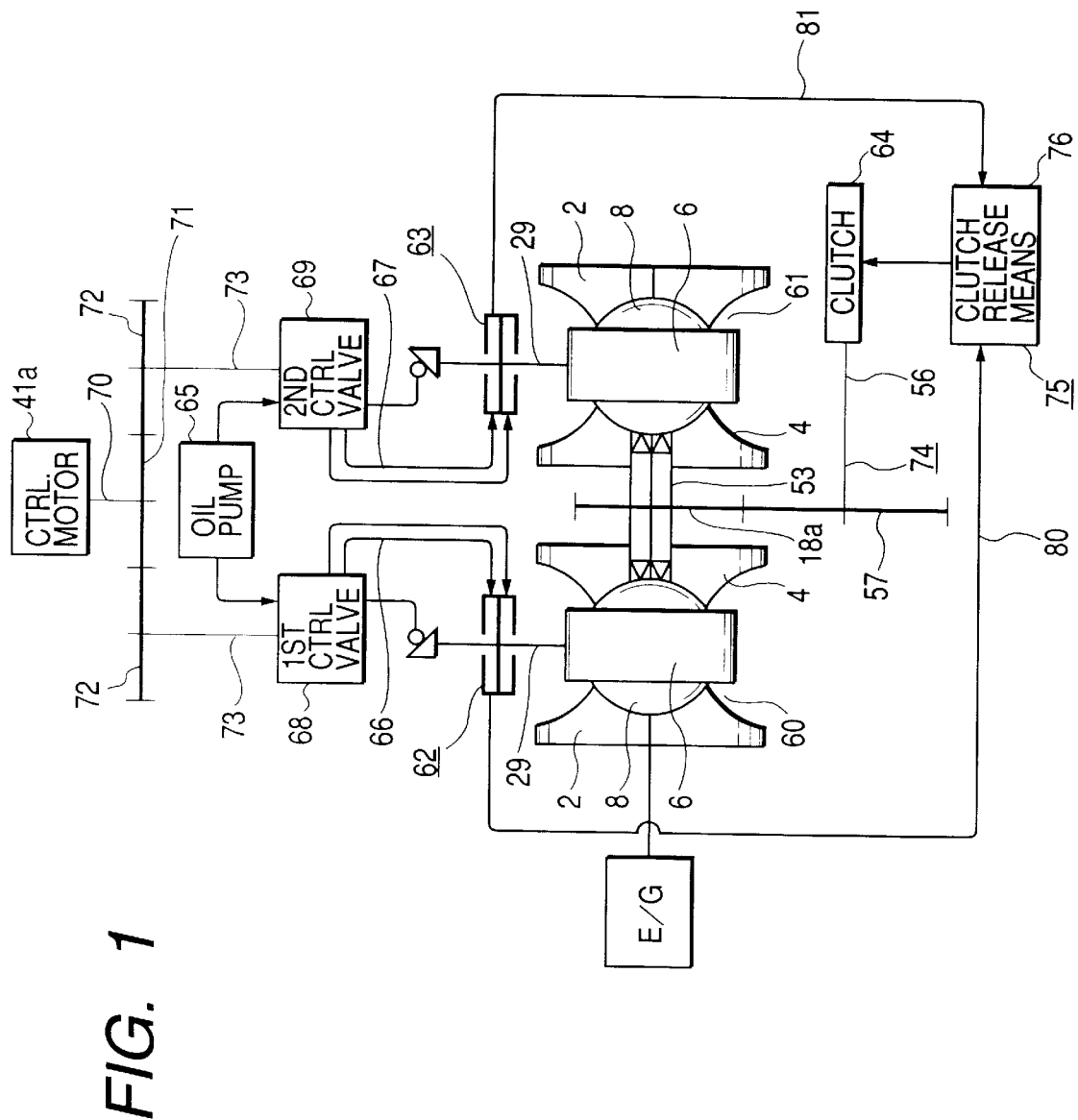
FIG. 1 is a typical diagram showing a first example of a first embodiment of the present invention.

Some preferred embodiments of the present invention will hereinafter be described with reference to the accompanying drawings.

A toroidal type continuously variable transmission according to a first embodiment of the present invention shown in FIGS. 1 to 4 is provided with a first supply and discharge flow path for supplying and discharging pressure oil to a first actuator, a second supply and discharge flow path provided independently of this first supply and discharge flow path to supply and discharge the pressure oil to a second actuator, a clutch connected in series in the course of power taking-out means, and clutch liberating means for cutting off the connection of this clutch. A first control valve for controlling the supply and discharge of the pressure oil to the first actuator is provided in the course of the first supply and discharge flow path, and a second control valve for controlling the supply and discharge of the pressure oil to the second actuator is provided in the course of the second supply and discharge flow path. The clutch liberating means cuts off the connection of the clutch when the difference between oil pressure driving the first actuator and oil pressure driving the second actuator reaches a predetermined value or greater.

In the case of the toroidal type continuously variable transmission of the present invention constructed as described above, the oil pressure fed into the first actuator and the oil pressure fed into the second actuator can be controlled independently of each other. Therefore, the amounts of displacement of trunnions installed in cavities can be made substantially equal to each other independently of the ease with which the cavity portions are resiliently deformed. Accordingly, independently of the ease with which the cavity portions are resiliently deformed, the amounts of displacement of the trunnions installed in the cavity portions are made equal to each other and the angles of inclination of power rollers installed in the cavities are made substantially equal to each other, whereby the aggravation of transmission efficiency or the occurrence of a trouble such as abnormal abrasion or burning can be prevented.

When the difference between the oil pressure fed into the first actuator and the oil pressure fed into the second actuator becomes great exceeding the range which may be created by the ease with which the cavity portions are resiliently deformed, the clutch liberating means cuts off the connection of the clutch. That is, a state in which the difference between the oil pressure fed into the first actuator and the oil pressure fed into the second actuator has become great is considered to be a state in which the amounts of displacement of the trunnions installed in the cavity portions differ from each other and in one or both cavity portions, remarkable sliding friction occurs to the portions of contact between the peripheral surfaces of the power rollers and each concave surface. If such a state continues, burning may occur in the toroidal type continuously variable transmission and this toroidal type continuously variable transmission may be locked (become unrotatable). If no countermeasure is taken when the toroidal type continuously variable transmission connected to the driving wheels of an automobile is locked, sudden brakes may be applied to the automobile in cooperating the toroidal type continuously variable transmission therein, for example, the driving wheels are locked. In contrast, in the case of the toroidal type continuously variable transmission of the present invention, the connection of the clutch is cut off, whereby the connection between the driving wheels and the toroidal type continuously variable transmission can be cut off and the driving wheels can be prevented from being locked so that the automobile can be safely stopped by an ordinary braking operation.

Figure 2:
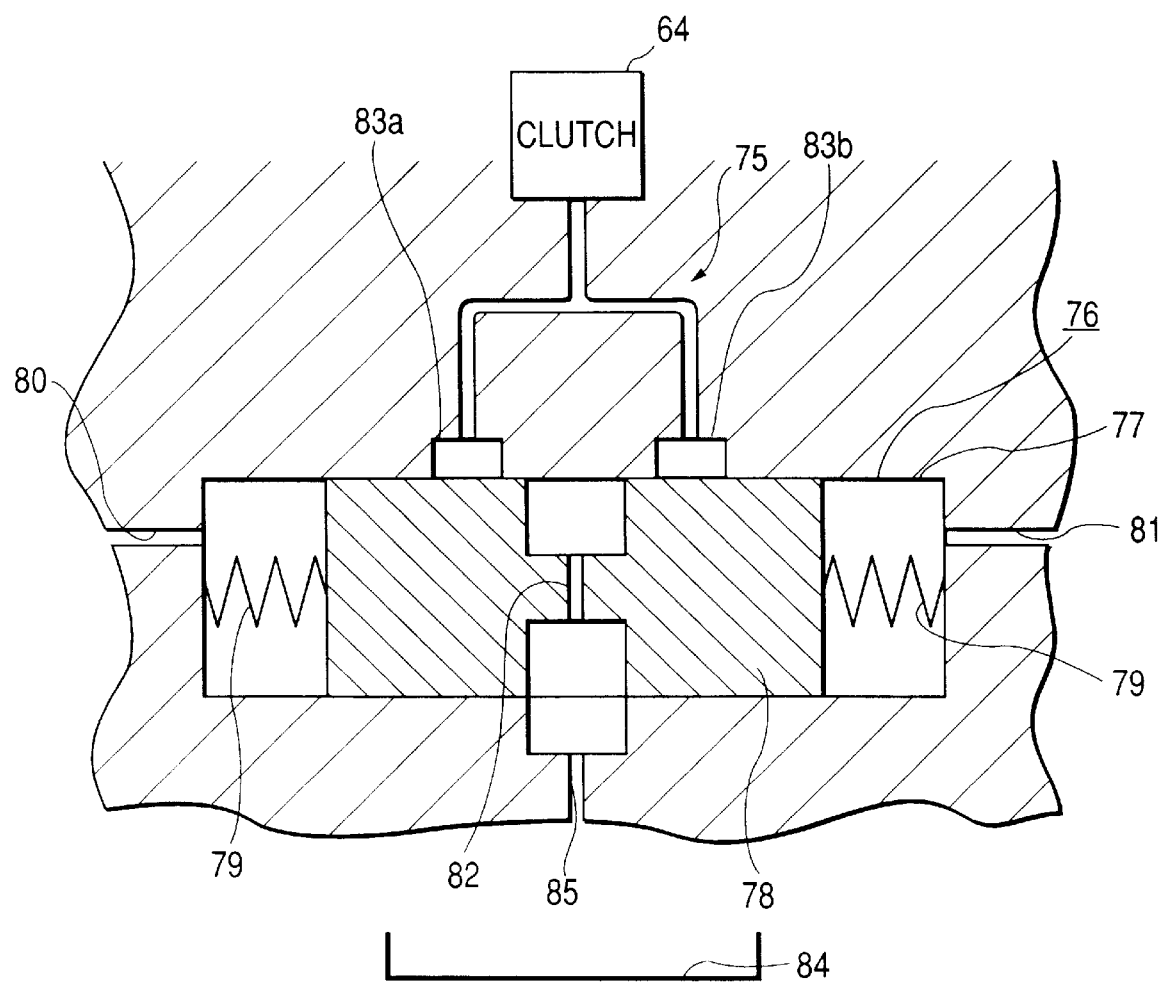
FIG. 2 is a substantial cross-sectional view showing a differential valve constituting clutch liberating means in its ordinary state.
Figure 3:
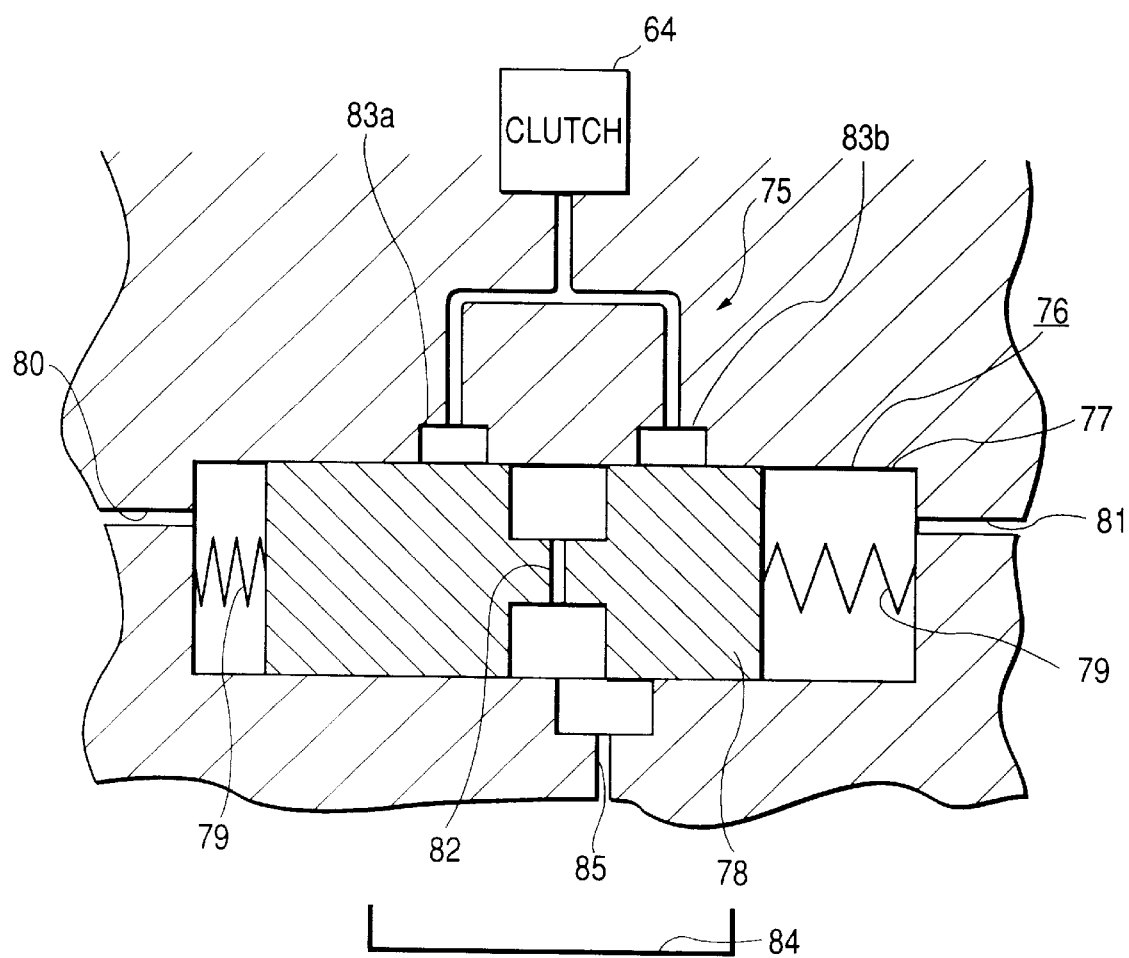
FIG. 3 is a substantial cross-sectional view showing the same differential valve in its state when abnormality has occurred.
Figure 8:
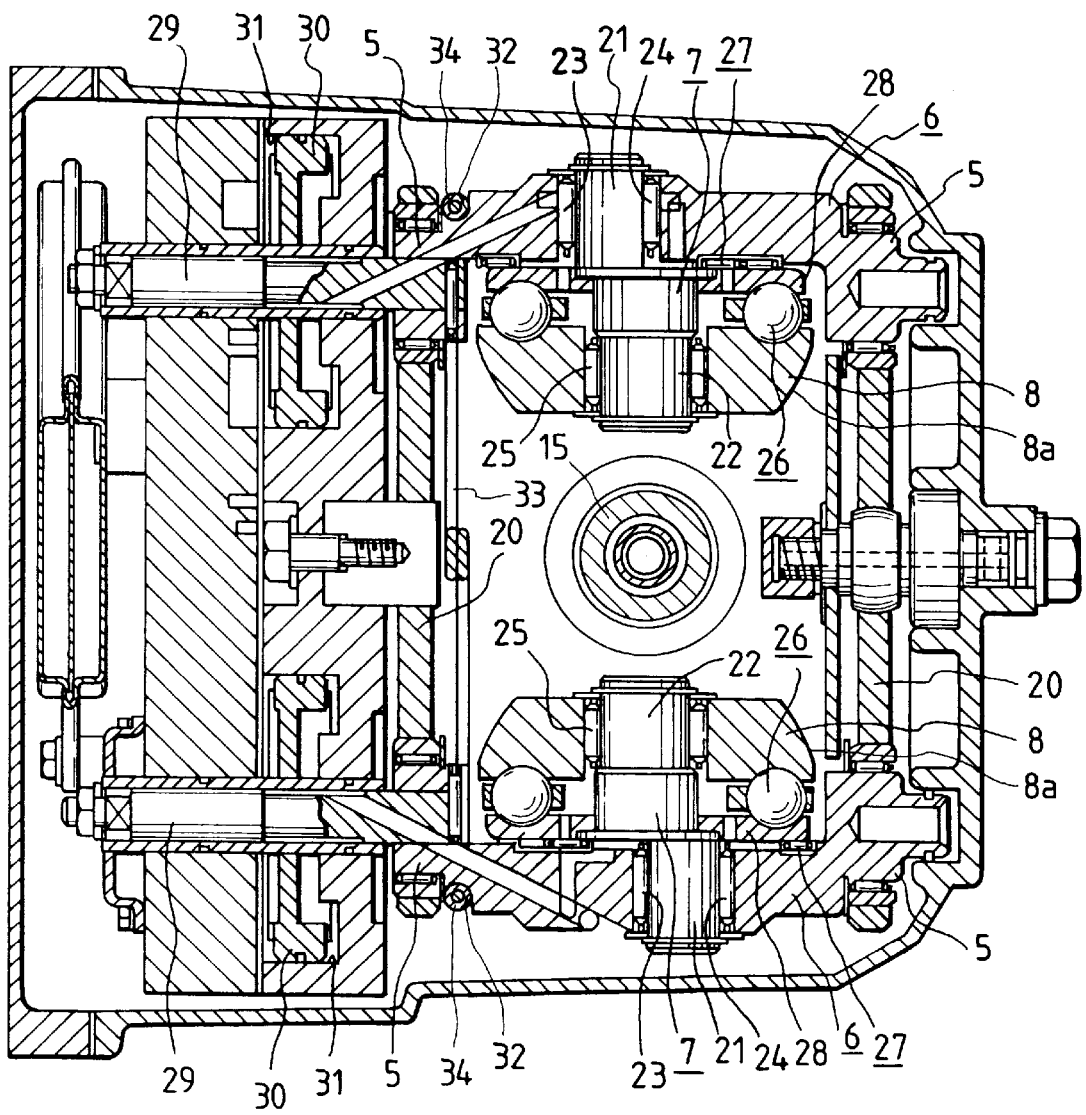
FIG. 8 is a cross-sectional view taken along the line 8—8 of FIG. 7.
Figure 9:
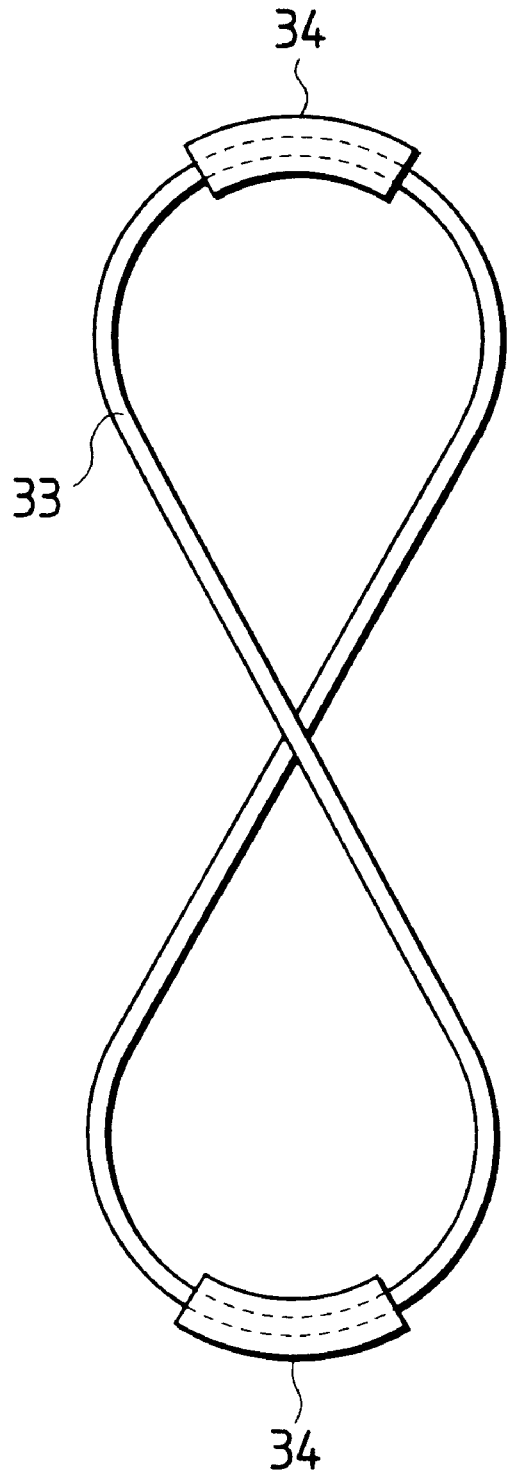
FIG. 9 shows an example of a heretofore known cable as it is seen from laterally of FIG. 8.

FIGS. 1 to 3 show a first example of the first embodiment of the present invention. The features of this embodiment reside in an oil pressure control circuit for controlling oil pressure fed into first and second actuators 62 and 63 for axially displacing trunnions 6, 6 provided in first and second cavities 60 and 61 to change the transmission gear ratio in these two cavities 60 and 61 in the toroidal type continuously variable transmission of the double cavity type, and a clutch 64 of which the connection is cut off correspondingly to the operation of the oil pressure control circuit. The specific structure and action of each constituent of the body portion of the toroidal type continuously variable transmission are similar to those of the prior art shown in FIGS. 7 to 11 and therefore, the showing and description of the similar portions are omitted or simplified, and chiefly the characteristic portions of the present invention will hereinafter be described. The first and second actuators 62 and 63, as shown in FIG. 8, are hydraulic cylinders of the so-called double action type comprising a driving piston 30 oil-tightly fitted inside a driving cylinder 31.

A first supply and discharge flow path 66 for supplying and discharging pressure oil to the first actuator 62 is provided between the discharge port of a pressure oil pump 65 which is a pressure oil source and the first actuator 62. Also, a second supply and discharge flow path 67 for supplying and discharging the pressure oil to the second actuator 63 is provided between the discharge port of the pressure oil pump 65 and the second actuator 63. The second supply and discharge flow path 67 and the first supply and discharge flow path 66 are provided independently of each other. Of these first and second supply and discharge flow paths 66 and 67, in the course of the first supply and discharge flow path 66, a first control valve 68 for controlling the supply and discharge of the pressure oil to the first actuator 62 is provided in series. Also, in the course of the second supply and discharge flow path 67, a second control valve 69 for controlling the supply and discharge of the pressure oil to the second actuator 63 is provided in series.

Figure 10:
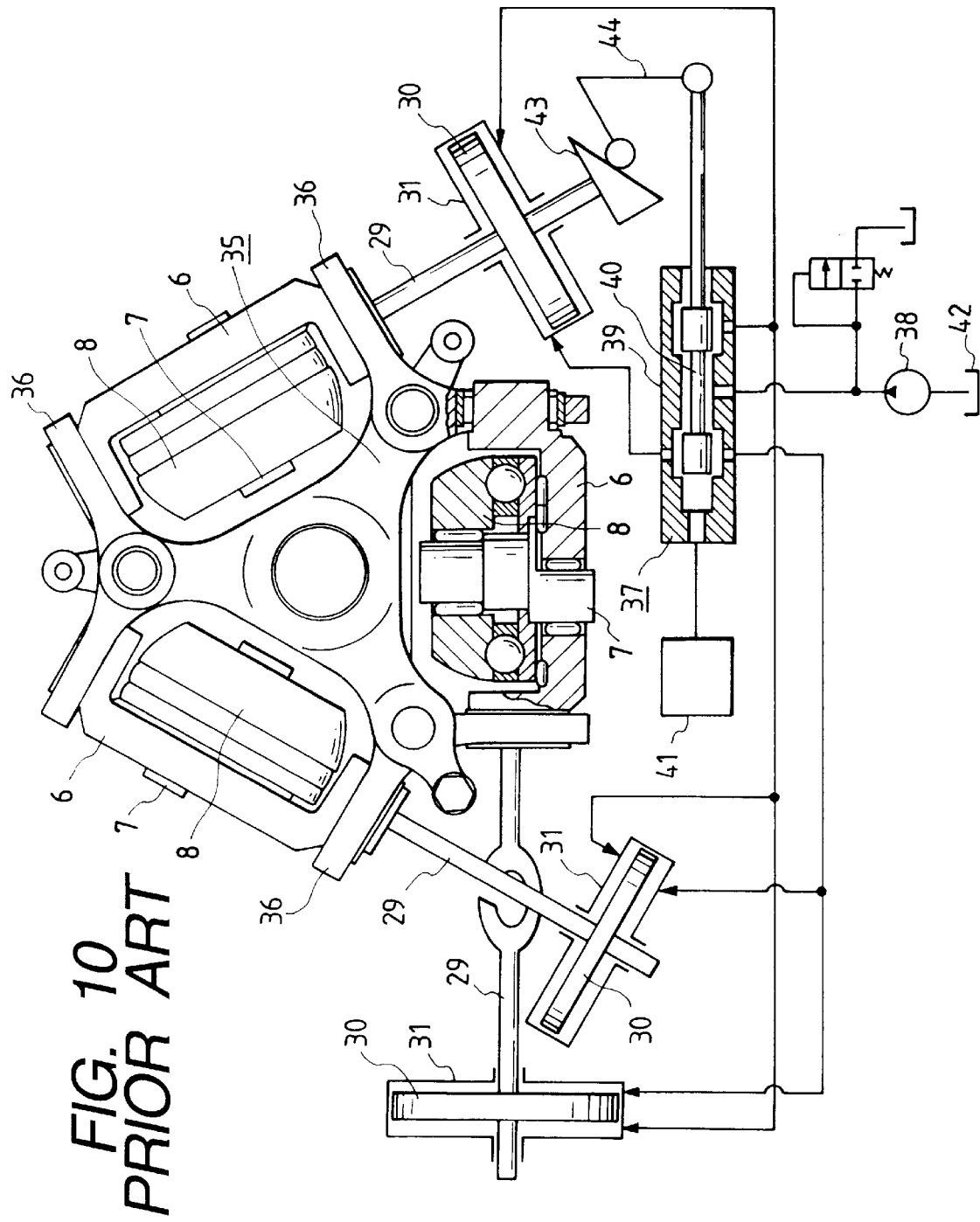
FIG. 10 is a partly cross-sectional view showing a second example of the specific structure of the heretofore known toroidal type continuously variable transmission.
Figure 11:
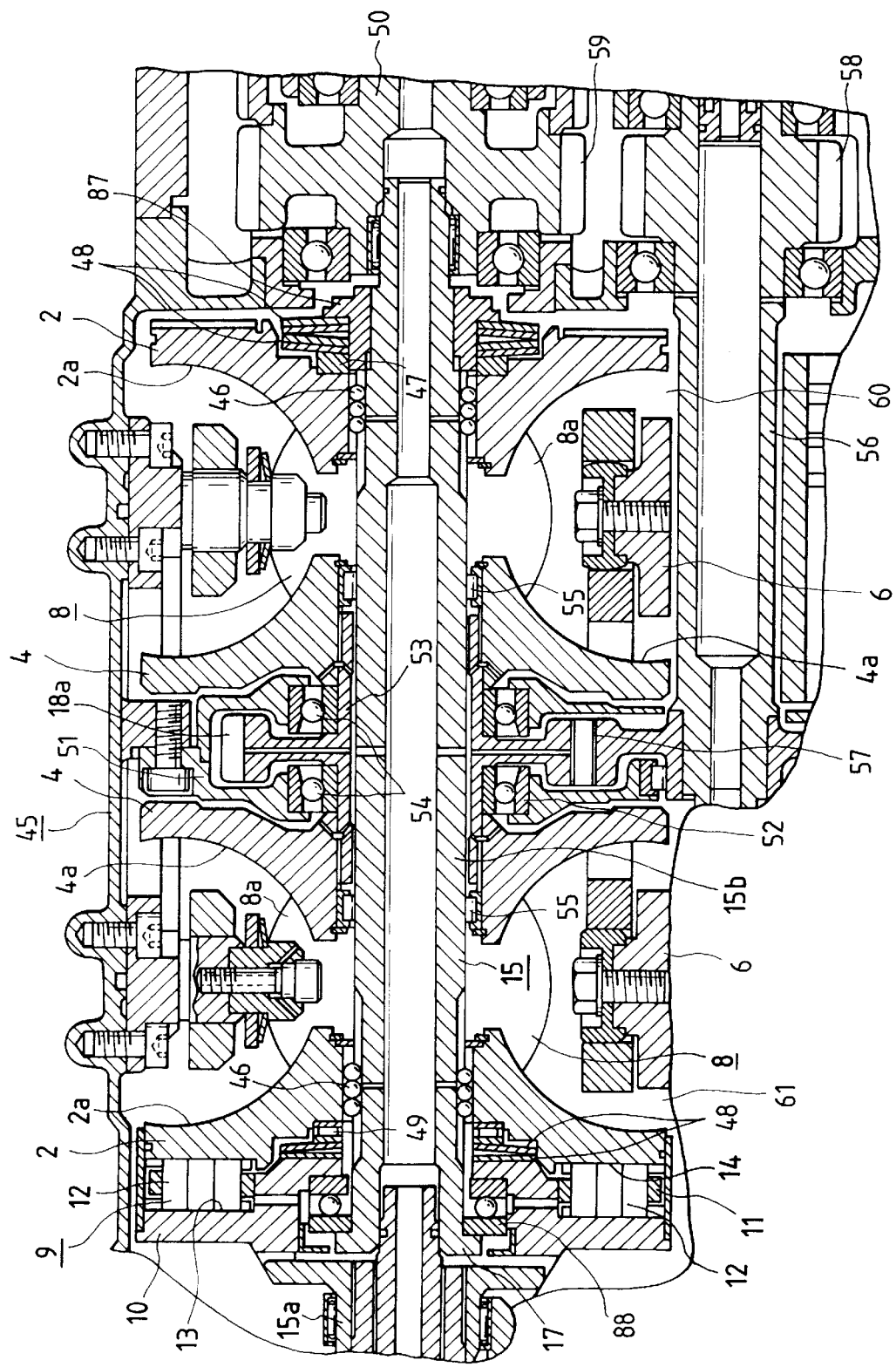
FIG. 11 is a fragmentary cross-sectional view showing a third example of the specific structure of the heretofore known toroidal type continuously variable transmission.

Each of these first and second control valves 68 and 69, like the control valve 37 incorporated in the prior-art structure shown in FIG. 10, comprises a sleeve 39 and a spool 40, and the sleeve 39 (or the spool 40) and the spool 40 (or the sleeve 39) are axially displaced by a control motor 41a and a driving rod 29 constituting the first and second actuators 62 and 63, respectively, thereby controlling the oil pressure fed into the first and second actuators 62 and 63. That is, the first and second control valves 68 and 69 control the oil pressure fed into the first and second actuators 62 and 63 to displace the trunnions 6, 6 in the first and second cavities 60 and 61 by an amount corresponding (proportional) to the amount of axial displacement of the sleeve 39 (or the spool 40) by the control motor 41a.

Figure 5:
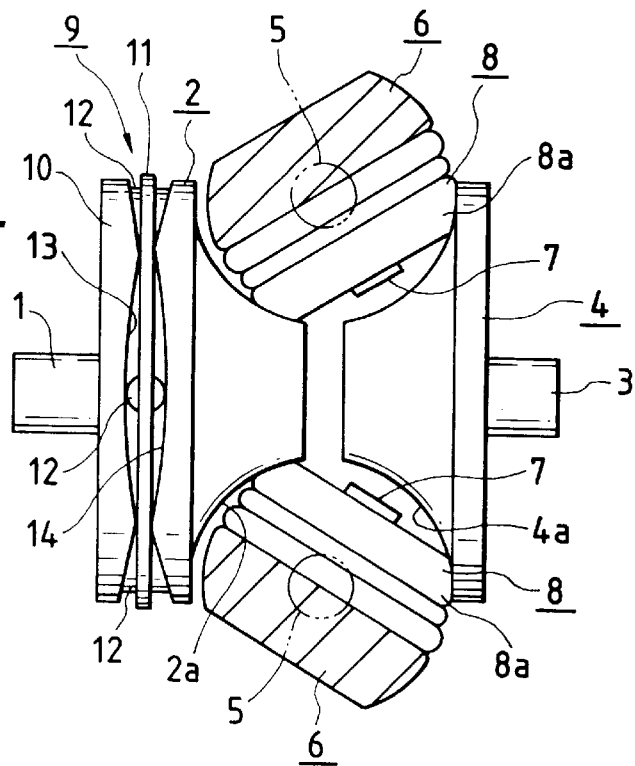
FIG. 5 is a side view showing the basic construction of a heretofore known toroidal type continuously variable transmission in its state during maximum deceleration.
Figure 6:
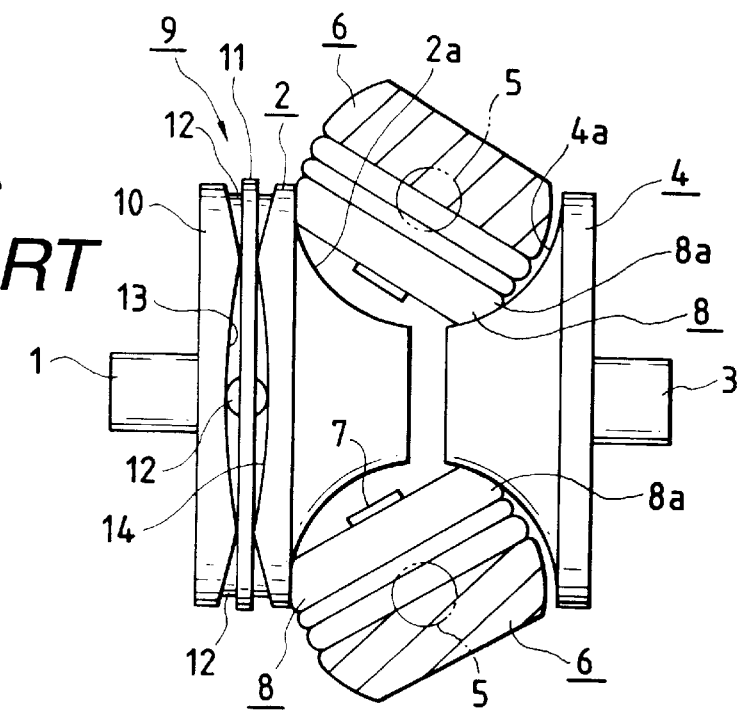
FIG. 6 is a side view showing the basic construction of the same toroidal type continuously variable transmission in its state during maximum acceleration.
Figure 7:
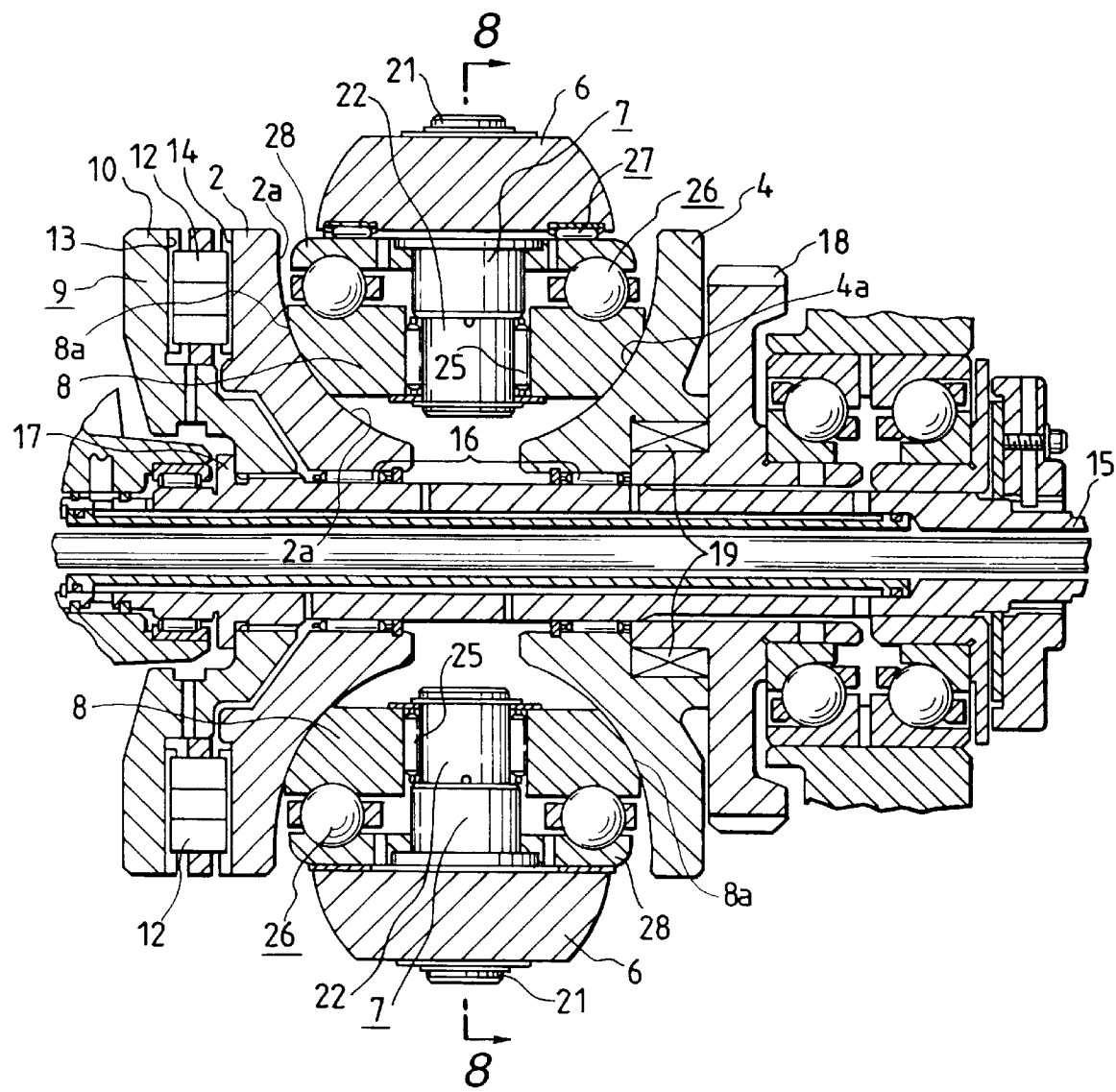
FIG. 7 is a cross-sectional view showing a first example of the specific structure of the heretofore known toroidal type continuously variable transmission.

In the case of the present example, the first and second control valves 68 and 69 are controllable in synchronism with each other by the single control motor 41a corresponding to a single driving mechanism described in the appended claims. That is, a pair of driven gears 72, 72 are brought into meshing engagement with a drive gear 71 fixed to the output shaft 70 of this control motor 41a. These driven gears 72, 72 are fixed to the input shafts 73, 73 of the first and second control valves 68 and 69. These control valves 68 and 69 displace the sleeve 39 (or the spool 40) by an amount (axial length) conforming to the amount of rotation (the angle of rotation) of the input shafts 73, 73, and set the amount by which the trunnions 6, 6 are to be displaced axially of the pivots 5, 5 (see FIGS. 5, 6 and 8).

Also, in the course of a transmission shaft 56 constituting the power taking-out means 74, a clutch 64 is connected in series with this transmission shaft 56. In the case of the present example, the power taking-out means 74 is comprised of the transmission shaft 56, a sleeve 53 provided between a pair of output side discs 4, 4, an output gear 18a secured to the outer peripheral surface of the intermediate portion of the sleeve 53, and a first transmission gear 57 secured to the end portion of the transmission shaft 56. Although not shown in FIG. 1, the rear stage side of the power taking-out means 74 such as a second transmission gear 58 (see FIG. 1) is connected to the rear stage side of the clutch 64. The clutch 64 normally becomes connected on the basis of the oil pressure in an oil pressure chamber provided in the clutch 64 and transmits power from the front stage side to the rear stage side of the power taking-out means 74. In contrast, during the operation of the clutch liberating means 75 which will be described next, the oil pressure chamber is opened to the atmosphere to thereby cut off the connection between the front stage side and the rear stage side.

The clutch liberating means 75 is provided with a differential valve 76. This differential valve 76 comprises a differential valve member 78 oil-tightly fitted in a cylinder 77 for axial displacement. Also, this differential valve member 78 is resiliently urged toward the axially central position of the cylinder 77 by a pair of reseating springs 79, 79. Accordingly, the differential valve member 78 exists at its neutral position shown in FIG. 2 unless any extraneous force acts thereon. Also, the oil pressure in the first actuator 62 is introduced into one end portion (the left end portion as viewed in FIGS. 2 and 3) of the cylinder 77 through a first oil pressure introduction path 80. On the other hand, the oil pressure in the second actuator 63 is introduced into the other end portion (the right end portion as viewed in FIGS. 2 and 3) of the cylinder 77 through a second oil pressure introduction path 81. The oil pressure introduced from the first and second actuators 62 and 63 into the opposite ends of the cylinder 77 is introduced from the portions of the actuators 62 and 63 which correspond to each other, i.e., the portions which should theoretically be at the same oil pressure.

Also, a communicating path 82 for communicating the diametrally opposite inner sides of the cylinder 77 with each other is provided in the axially central portion of the differential valve member 78. In diametrally one side (the upper side as viewed in FIGS. 2 and 3) portion of the inner peripheral surface of the intermediate portion of the cylinder 77, a pair of communicating ports 83a, 83b leading to the oil pressure chamber of the clutch 64 are provided in such a manner as to sandwich the communicating path 82 therebetween in spaced apart relationship with each other axially of the cylinder 77. Also, in the diametrally other side (the lower side as viewed in FIGS. 2 and 3) portion of the inner peripheral surface of the intermediate portion of the cylinder 77, a drain port 85 opened to the atmosphere by leading to an oil reservoir 84 is provided in such a manner as to always communicate with the communicating path 82 irrespective of the displacement of the differential valve member 78. In a state in which as shown in FIG. 2, the differential valve member 78 exists in the neutral position of the cylinder 77, i.e., a state in which the oil pressure in the first actuator 62 and the oil pressure in the second actuator 63 are substantially equal to each other, the pair of communicating ports 83a, 83b are closed by the land portion of the differential valve member 78, and with the pressure oil remaining enveloped in the clutch 64, the clutch 64 is maintained connected. If necessary in this case, an oil supply route for feeding the pressure oil into the oil pressure chamber of the clutch 64 is provided to maintain the clutch 64 in its connected state.

In contrast, in a state in which the difference between the oil pressure in the first actuator 62 and the oil pressure in the second actuator 63 has become great, the differential valve member 78 is axially displaced in the cylinder 77, as shown in FIG. 3, and the communicating path 82 provided in the axially central portion of the differential valve member 78 communicates one of the communicating ports 83a and 83b and the drain port 85 with each other. As the result, the pressure in the oil pressure chamber of the clutch 64 drops, whereby the connection of this clutch 64 is cut off. In this case, the supply of the pressure oil into the oil pressure chamber of the clutch 64 through the oil supply route is stopped, or the quantity of pressure oil fed into the oil pressure chamber through the oil supply route is made sufficiently smaller than the quantity of pressure oil discharged from this oil pressure chamber through the communicating path 82.

In the case of the toroidal type continuously variable transmission of the present invention constructed as described above, the oil pressure fed into the first actuator 62 and the oil pressure fed into the second actuator 63 can be controlled independently of each other. Therefore, the amounts of displacement of the trunnions 6, 6 installed in the first and second cavities 60 and 61 can be made substantially equal to each other, independently of the ease with which the portions of the cavities 60 and 61 are resiliently deformed. That is, on the basis of the supply of electric power to the control motor 41a, the sleeves 39 (see FIG. 10) of the first and second control valves 68 and 69 are axially displaced by the same length. With the trunnions 6, 6 in the cavities 60, 61 displaced by an amount corresponding to the axial displacement of the sleeves 39, the first and second control valves 68 and 69 stop the supply and discharge of the pressure oil into the first and second actuators 62 and 63. Accordingly, independently of the ease with which the portions of the cavities 60, 61 are resiliently deformed, the angles of inclination of the power rollers 8, 8 installed in the cavities 60, 61 can be made substantially equal to each other to thereby prevent the aggravation of transmission efficiency or the occurrence of a trouble such as abnormal abrasion or burning. In the prior-art toroidal type continuously variable transmission of the double cavity type, a cable has been extended between the first and second cavities 60 and 61 to equalize the angles of inclination of the power rollers 8, 8 installed in the cavities 60, 61. In the case of the present invention, as described above, the angles of inclination of the power rollers 8, 8 installed in the cavities 60, 61 can be made substantially equal to each other and therefore, the above-mentioned cable can be disused.

Also, when the difference between the oil pressure fed into the first actuator 62 and the oil pressure fed into the second actuator 63 becomes great beyond the range which may be created by the ease with which the portions of the cavities 60, 61 are resiliently deformed, the clutch liberating means 75 cuts off the connection of the clutch 64. That is, when the difference between the oil pressure fed into the actuator 62 and the oil pressure fed into the actuator 63 becomes abnormally great, the changed-over state of the differential valve 76 becomes such as shown in FIG. 3, and the oil pressure in the oil pressure chamber of the clutch 64 is released to thereby cut off the connection of this clutch 64.

The state in which as described above, the difference between the oil pressure fed into the actuator 62 and the oil pressure fed into the actuator 63 has become abnormally great is considered to be a state in which the amounts of displacement of the trunnions 6, 6 installed in the cavities 60, 61 differ from each other and remarkable sliding friction occurs to the portions of contact between the peripheral surfaces 8a (see FIGS. 5 to 8 and 11) of the power rollers 8, 8 in one or both cavities 60, 61 and the inner sides 2a, 4a of the input side and output side discs 2 and 4 which are first and second concave surfaces. If such a state continues, burning will occur in the toroidal type continuously variable transmission and this toroidal type continuously variable transmission may be locked (become unrotatable). If no countermeasure is taken when the toroidal type continuously variable transmission connected to the drive wheels of an automobile is locked, sudden brakes may be applied to the automobile incorporating the toroidal type continuously variable transmission therein, for example, the drive wheels are locked. In contrast, in the case of the toroidal type continuously variable transmission of the present invention, the connection of the clutch 64 is cut off to thereby cut off the connection between the drive wheels and the toroidal type continuously variable transmission and prevent the drive wheels from being locked so that the automobile can be safely stopped by an ordinary braking operation.

Figure 4:
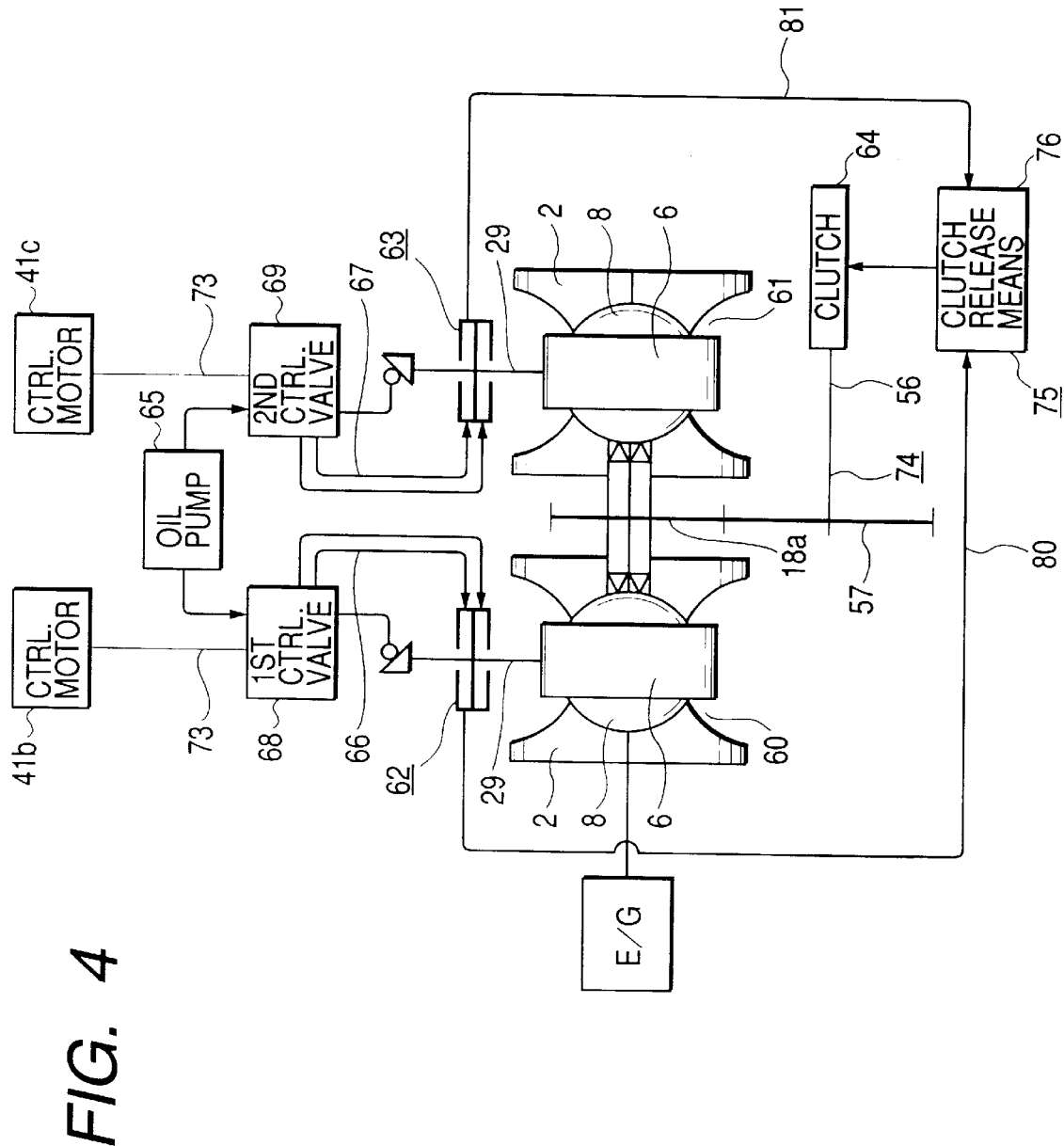
FIG. 4 is a typical view showing a second example of the first embodiment of the present invention.

Next, FIG. 4 shows a second example of the first embodiment of the present invention. In the case of this example, the first and second control valves 68 and 69 are controllable independently of each other by independent control motors 41b and 41c. Accordingly, in the case of the present example, when the difference in the amount of resilient deformation is great between the first and second cavities 60 and 61 and the transmission gear ratios obtained when the amounts of displacement of the trunnions 6, 6 are made equal to each other differ from each other, the first and second control valves 68 and 69 can be appropriately controlled in conformity with the above-mentioned difference in the amount of deformation. In the other points, the construction and action of the present example are similar to those of the above-described first example and therefore, like portions are given like reference numerals and overlapping description will be omitted. In the case of the above-described structure of the first example, there is the advantage that when the difference in the amount of resilient deformation is small between the first and second cavities 60 and 61 and the transmission gear ratios obtained in the portions of the cavities 60 and 61 become equal to each other if only the amounts of displacement of the trunnions 6, 6 are made equal to each other, the entire apparatus can be constructed compactly be the use of a single control motor 41a.

As described in Japanese Laid-Open Patent Application No. 1-169169 and Japanese Laid-Open Patent Application No. 1-312266, there is known structure in which a toroidal type continuously variable transmission and a planetary gear reduction mechanism are combined together, and during low-speed running, a drive force is transmitted by only the toroidal type continuously variable transmission and during high-speed running, the drive force is transmitted by the planetary gear mechanism to thereby reduce the torque applied to the toroidal type continuously variable transmission during high-speed running and achieve the improved durability of each constituent member. When the present invention is embodied into such structure, a clutch is provided in each transmitting portion constituting this structure and the connection of all the clutches is cut off when abnormality occurs, or a clutch is provided between the entire transmission in which the toroidal type continuously variable transmission and the planetary gear reduction mechanism are combined together and driving wheels and the connection of this clutch is cut off when abnormality occurs, or a plurality of clutches are provided between the toroidal type continuously variable transmission and the planetary gear reduction mechanism and the connection of all the clutches is cut off when abnormality occurs. In any case, design is made such that the locking of the toroidal type continuously variable transmission is not found up with the locking of the driving wheels. Further, each of the above-described examples is designed such that the opened or closed state of the differential valve 76 is controlled by the difference between the oil pressure in the first actuator 62 and the oil pressure in the second actuator 63. In contrast, the oil pressure in the first actuator 62 and the oil pressure in the second actuator 63 are detected by first and second pressure sensors independent of each other and the detection signals of these two pressure sensors can be electrically compared with each other to thereby control the opened or closed state of an electromagnetic valve for controlling the connection and disconnection of the clutch.

Figure 12:
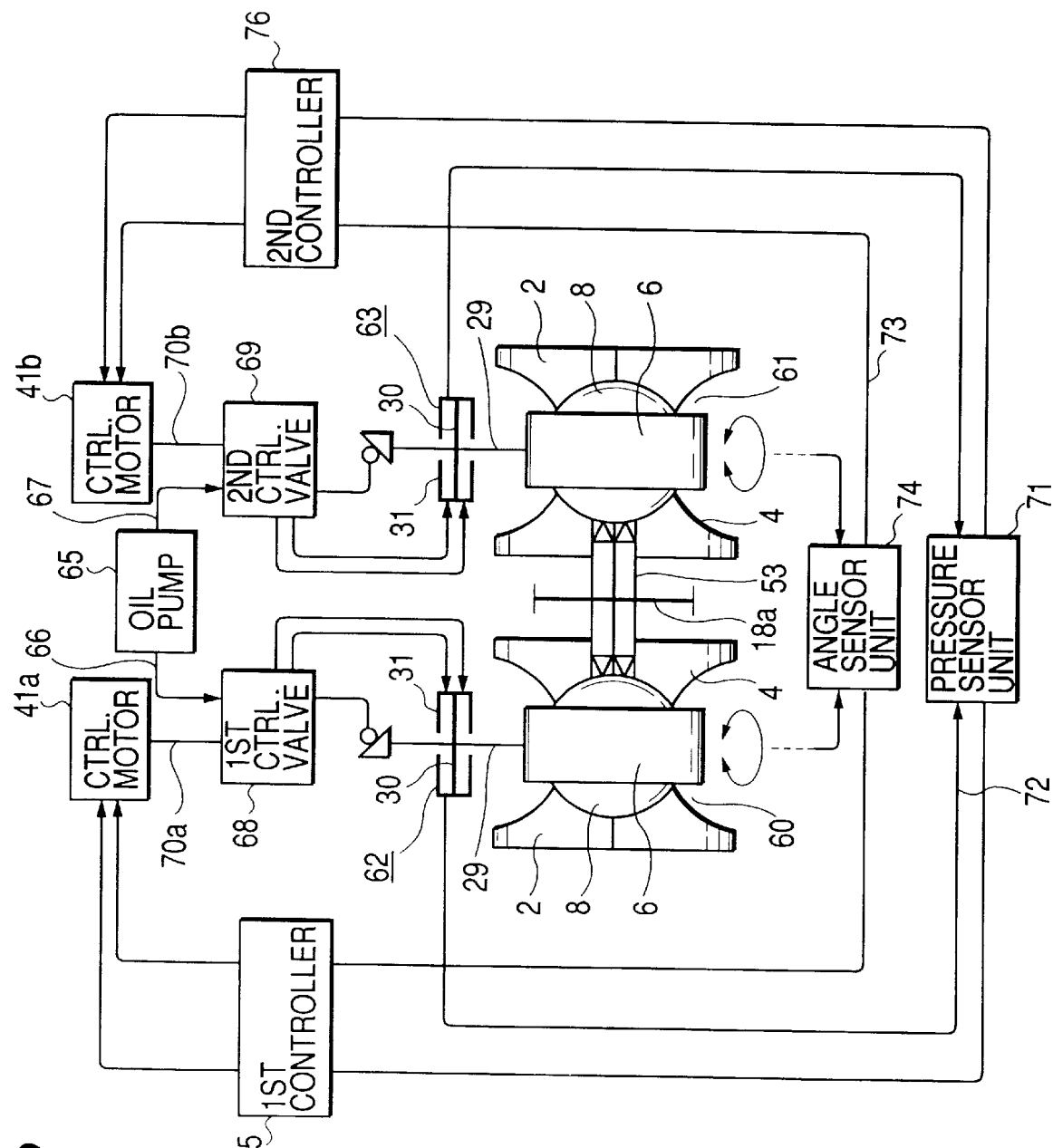
FIG. 12 is a typical diagram showing a second embodiment of the present invention.

FIG. 12 shows a second embodiment of the present invention.

In the second embodiment, first and second control valves 68 and 69, like the control valve 37 incorporated in the prior-art structure shown in FIG. 10, comprise a sleeve 39 and a spool 40, and the sleeve 39 (or the spool 40) is axially displaced by control motors 41a, 41b and the spool 40 (or the sleeve 39) is axially displaced by driving rods 29, 29 constituting the first and second actuators 62 and 63, thereby controlling oil pressure fed into the first and second actuators 62 and 63. That is, the first and second control valves 68 and 69 control the oil pressure fed into the first and second actuators 62 and 63 to displace the trunnions 6, 6 in the first and second cavities 60 and 61 by an amount corresponding (propositional) to the amount of axial displacement of the sleeve 39 (or the spool 40) by the control motors 41*a*, 41*b*.

In the case of the present embodiment, the first and second control valves 68 and 69 are controllable independently of each other by the control motors 41*a* and 41*b* independent of each other. That is, the tip end portions of the output shafts 70*a*, 70*b* of these control motors 41*a*, 41*b* are coupled and fixed to the input shafts of the first and second control valves 68 and 69. These control valves 68 and 69 displace the sleeve 39 (or the spool 40) by an amount (axial length) conforming to the amount of rotation (the angle of rotation) of their respective input shafts, and set an amount by which the trunnions 6, 6 should be displaced axially of the pivots 5, 5 (see FIGS. 5, 6 and 8).

Also, the oil pressure in the first and second actuators 62 and 63 and the angle of rotation of the trunnions 6, 6 provided in the first and second cavities 60 and 61 are detectable to control the amount of rotation and the direction of rotation of the input shafts 70*a*, 70*b* of the first and second control valves 68 and 69. First, an oil pressure sensor unit 71 is provided to make the oil pressure in the first and second actuators 62 and 63 detectable. This oil pressure sensor unit 71 comprises two independent sensors contained therein to detect the oil pressure in the first actuator 62 and the oil pressure in the second actuator 63 independently of each other. The oil pressure in the first actuator 62 and the oil pressure in the second actuator 63 are introduced into such an oil pressure sensor unit 70 through a first oil pressure introduction path 72 and a second oil pressure introduction path 73, respectively. The introduction of the oil pressure from the first and second actuators 62 and 63 into each sensor portion constituting the oil pressure sensor unit 71 is done from those portions of the actuators 62 and 63 which correspond to each other, i.e., those portions which should theoretically be at the same oil pressure.

Further, an angle sensor unit 74 is provided to detect the angle of rotation of the trunnions 6, 6 provided in the first and second cavities 60 and 61. This angle sensor unit 74 comprises a combination of angle sensors such as encoders provided on the pivots 5, 5 (see FIGS. 5, 6 and 8) secured to the end portions of the trunnions 6, 6 and capable of detecting the angles of inclination of these pivot shafts 5, 5 independently of each other.

Of the detection signals of the oil pressure sensor unit 71 and the angle sensor unit 74 as described above, an oil pressure signal representative of the oil pressure in the first actuator 62 and an angle signal representative of the angle of inclination of the pivot 5 secured to the trunnion 6 in the first cavity 60 are inputted to a first controller 75. This first controller 75 controls the angle and direction of rotation of the control motor 41*a* on the basis of the oil pressure and angle signals, and controls the opened or closed state of the first control valve 68 to regulate the angle of inclination of the trunnion 6 in the first cavity 60 to a desired value.

On the other hand, an oil pressure signal representative of the oil pressure in the second actuator 63 and an angle signal representative of the angle of inclination of the pivot shaft 5 secured to the trunnion 6 in the second cavity 61 are inputted to a second controller 76. This second controller 76 controls the angle and direction of rotation of the control motor 41*b* on the basis of the oil pressure and angle signals, and controls the opened or closed state of the second control valve 69 to regulate the angle of inclination of the trunnion 6 in the second cavity 61 to a desired valve.

To adjust the angles of inclination of the trunnions 6, 6 in the first and second cavities 60 and 61 to desired values by feedback control, it will suffice if there are the above-described angle signals. The above-described oil pressure signals are utilized to achieve fail-safe such as judging a trouble when the difference between the oil pressure supplied to the first actuator 62 and the oil pressure supplied to the second actuator 63 becomes two great, or to adjust the above-described angles of inclination by feedback control. When feed forward control is effected, the detection signal of the angle sensor unit 74 is used for fail-safe. Accordingly, one of the oil pressure sensor unit 71 and the angle sensor unit 74 is not a requisite when the present invention is carried out.

In the case of the toroidal type continuously variable transmission of the present invention constructed as described above, the oil pressure fed into the first actuator 62 and the oil pressure fed into the second actuator 63 can be controlled independently of each other. Therefore, the amounts of displacement of the trunnions 6, 6 installed in the first and second cavities 60 and 61 can be made substantially equal to each other, independently of the ease with which the portions of the cavities 60 and 61 are resiliently deformed. That is, on the basis of the supply of electric power to the control motors 41*a*, 41*b*, the sleeves 39 of the first and second control valves 68 and 69 are axially displaced by the same length as a predetermined length taking the amounts of resilient deformation of the portions of the first and second cavities 60 and 61. With the trunnions 6, 6 in the first and second cavities 60 and 61 displaced by an amount corresponding to the axial displacement of the sleeve 39, the first and second control valves 68 and 69 stop the supply and discharge of the pressure oil into the first and second actuators 62 and 63.

Accordingly, independently of the ease with which the portions of the cavities 60 and 61 are resiliently deformed, the angles of inclination of the trunnions 6, 6 installed in these cavities 60 and 61 can be made equal to each other and the angles of inclination of the power rollers 8, 8 installed in the cavities 60 and 61 can be made equal to each other to thereby prevent the aggravation of transmission efficiency or the occurrence of a trouble such as abnormal abrasion or burning. In the prior-art toroidal type continuously variable transmission of the double cavity type, a cable has been extended between the first and second cavities 60 and 61 to equalize the angles of inclination of the power rollers 8, 8 installed in the first and second cavities 60 and 61. In the case of the present invention, as described above, the angles of inclination of the power rollers 8, 8 installed in the cavities 60 and 61 can be made substantially equal to each other and therefore, the above-mentioned cable can be disused.

The present invention is constructed and acts as described above and can therefore improve the efficiency and reliability of a toroidal type continuously variable transmission and can contribute to the practical use of the toroidal type continuously variable transmission as an automatic transmission for an automobile.

What is claimed is:

1. A toroidal type continuously variable transmission provided with a rotary shaft, a first disc and a second disc having their axial one surface made into a first concave surface of an arcuate cross-sectional shape, and supported on the axially opposite end portions of said rotary shaft for rotation with the rotary shaft with said first concave surfaces opposed to each other, a third disc and a fourth disc having their axial one surface made into a second concave surface of an arcuate cross-sectional shape, and supported around the intermediate portion of said rotary shaft for rotation relative to the rotary shaft with said second concave surfaces and said first concave surfaces opposed to each other, a first trunnion disposed between said first disc and said third disc with respect to the axial direction, displaceable axially of and pivotally movable about a pivot lying at a position twisted relative to said rotary shaft, and pivotally moved about said pivot with the displacement in the axial direction of said pivot, a second trunnion disposed between said second disc and said fourth disc with respect to the axial direction, displaceable axially of and pivotally movable about a pivot lying at a position twisted said rotary shaft, and pivotally moved about said pivot with the displacement in the axial direction of said pivot, a plurality of power rollers having their peripheral surfaces made into rotation actuate surface-like convex surfaces, rotatably supported on a displaceable shaft supported by said first and second trunnions, and sandwiched between first and second concave surfaces provided on said first and third discs or between first and second concave surfaces provided on said second and fourth discs, a first actuator for displacing said first trunnion axially of said pivot on the basis of the supply or discharge of pressure oil, a second actuator for displacing said second trunnion axially of said pivot on the basis of the supply or discharge of pressure oil, and power taking-out means for taking out the rotation of said third and fourth discs, characterized by the provision of a first supply and discharge flow path for supplying and discharging the pressure oil to said first actuator, a second supply and discharge flow path provided independently of said first supply and discharge flow path to supply and discharge the pressure oil to said second actuator, a first control valve provided in the course of said first supply and discharge flow path for controlling the supply and discharge of the pressure oil to said first actuator, and a second control valve provided in the course of said second supply and discharge flow path for controlling the supply and discharge of the pressure oil to said second actuator.

2. A toroidal type continuously variable transmission according to claim 1, characterized by a clutch connected in series in the course of said power taking-out means, and clutch liberating means for cutting off the connection of said clutch.

3. A toroidal type continuously variable transmission according to claim 2, characterized in that said clutch liberating means cuts off the connection of said clutch when the difference between the oil pressure for driving said first actuator and the oil pressure for driving said second actuator reaches a predetermined value or greater.

4. A toroidal type continuously variable transmission according to claim 3, characterized in that the fact that the difference between the oil pressure for driving said first actuator and the oil pressure for driving said second actuator has reached a predetermined value or greater can be judged by introducing the oil pressure in said first actuator and the oil pressure in said second actuator into a differential valve, and said differential valve displaces a differential valve member against the resilient force of a spring when the difference between the oil pressure for driving said first actuator and the oil pressure for driving said second actuator has reached said predetermined value or greater, thereby changing the supplied and discharged state of the pressure oil and cutting off the connection of the clutch.

5. A toroidal type continuously variable transmission according to claim 3, characterized in that the fact that the difference between the oil pressure for driving said first actuator and the oil pressure for driving said second actuator has reached a predetermined value or greater is judged by comparing the detection signal of a first pressure sensor for detecting the oil pressure in said first actuator and the detection signal of a second pressure sensor for detecting the oil pressure in said second actuator with each other, or directly comparing the oil pressure in said first actuator and the oil pressure in said second actuator with each other.

6. A toroidal type continuously variable transmission according to claim 1, characterized in that the driving of said first control valve and the driving of said second control valve are effected in synchronism with each other by a single driving mechanism.

7. A toroidal type continuously variable transmission according to claim 1, characterized in that said controlling means has an oil pressure sensor unit for measuring the oil pressure in said first and second actuators and/or an angle sensor unit for detecting the angles of rotation of said first and second trunnions, and controls so as to maintain the pressure in said first and second actuators and/or the angles of rotation of said first and second trunnions.

* * * * *